Nov. 3, 1970  TAKESHI TSURUTA ET AL  3,537,691
JUICE MIXER

Filed Feb. 18, 1969  2 Sheets-Sheet 1

Nov. 3, 1970    TAKESHI TSURUTA ET AL    3,537,691

JUICE MIXER

Filed Feb. 18, 1969    2 Sheets-Sheet 2

United States Patent Office 3,537,691
Patented Nov. 3, 1970

3,537,691
JUICE MIXER
Takeshi Tsuruta and Miyoshi Miwa, Kamakura, Japan, assignors to Mitsubishi Denki Kabushiki Kaisha, Tokyo, Japan
Filed Feb. 18, 1969, Ser. No. 800,166
Claims priority, application Japan, Feb. 23, 1968, 43/13,380
Int. Cl. B01f 7/16
U.S. Cl. 259—108          4 Claims

ABSTRACT OF THE DISCLOSURE

The disclosed mixer includes a main body in the form of a frusto-cone and a cup complementary in shape to the main body to be capable of overlapping the main body for packing purposes. To limit an extent to which the cup overlaps the main body, a peripheral shoulder is disposed on the outer periphery of the main body. Alternatively angularly spaced longitudinal ridges may be disposed on the inner periphery of the cup.

BACKGROUND OF THE INVENTION

This invention relates to the construction of juice mixers capable of decreasing their volumes upon packing and transporting them.

For transporting the conventional type of juice mixers it has been commonly practiced to pack the mixers while they are maintained in the normal used position where a cup involved is secured upon the main mixer body with its opening remote from the main body. The resulting packing is disadvantageous in that the overall height thereof increases and the volume thereof not only increases accordingly but also it much damages.

SUMMARY OF THE INVENTION

Accordingly it is an object of the invention to provide an improved juice mixer of the type including a main body having disposed therein an electric motor and a cup adapted to be separated away from the main body and disposed upside-down upon the main body thereby to decrease the overall height and therefore a volume required to pack the mixer.

With this object in view, the invention resides in a juice mixer comprising a main hollow body having disposed therein an electric motor including a rotary shaft, a cup member detachably secured upon the main body and having an opening at one end, a detachable cover member for closing the opening of the cup member, rotatable cutter means including a rotary shaft and disposed within the cup member at the other closed end to be driven by the electric motor, and a pair of coupling elements mounted on the rotary shafts of the electric motor and cutter means respectively and capable of engaging each other when the mixer is in its normal used position where the cup member is disposed upon the main body while the opening of the cup member is remote away from the main body, characterized in that the main body has that half portion near the cup member in the form of a frusto-cone formed about the axis of the rotary motor shaft and having a smaller end at the free end of that half portion of the main body while the inner peripheral surface on the side of the opening of the cup member is complementary in shape to the outer peripheral surface of the half portion of the main body so that the cup member disposed upside-down upon the main body overlaps the main body.

The main body may be preferably provided on the outer peripheral surface with a peripheral shoulder or seat for receiving the edge of the opening of the cup member in its overlapping position.

The cup member may be advantageously provided on the inner peripheral surface on the side of the opening with a plurality of angularly spaced longitudinal ridges for limiting the overlap of the upside-down cup member on the main body.

BRIEF DESCRIPTION OF THE DRAWINGS

The invention will become more readily apparent from the following detailed description taken in conjunction with the accompanying drawings in which.

Throughout the figures like reference numerals designate the corresponding or similar components.

DESCRIPTION OF THE PREFERRED EMBODIMENTS

Figure 1:
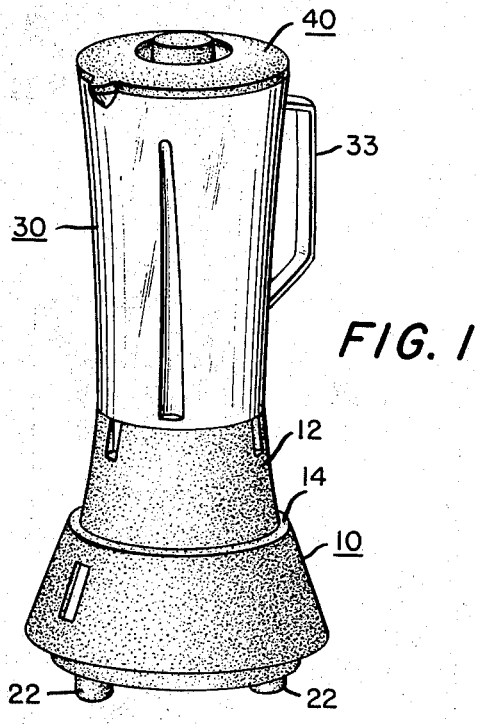
FIG. 1 is a perspective view of a juice mixer constructed in accordance of the teachings of the invention and illustrated in its normal used position.
Figure 2:
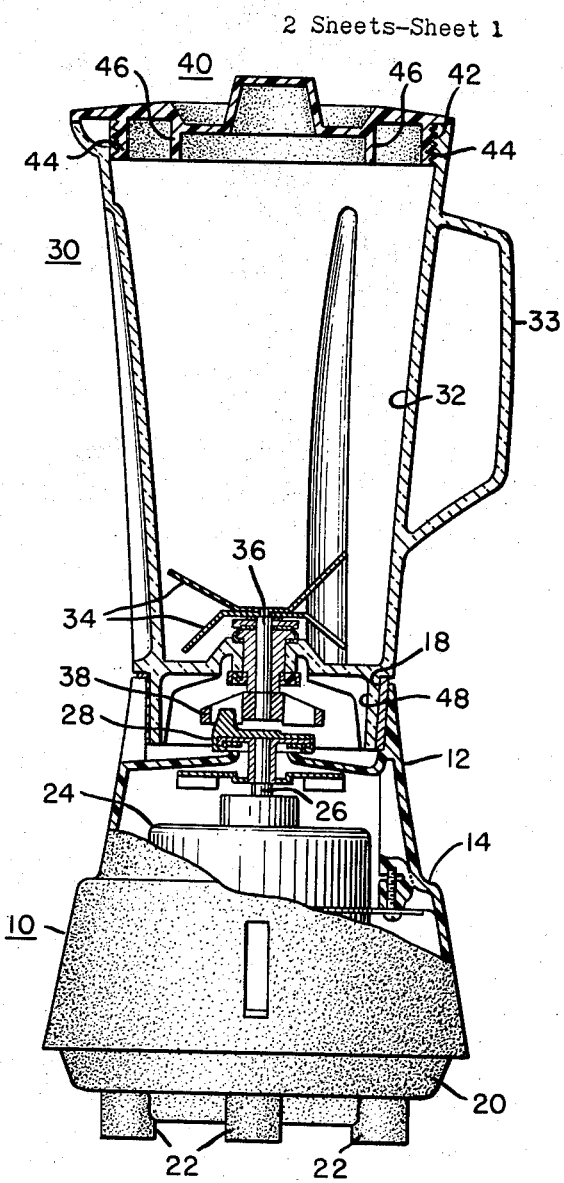
FIG. 2 is an elevational view, partly in section of the mixer shown in FIG. 1 with parts broken away for the purpose of illustrating the internal construction.
Figure 3:
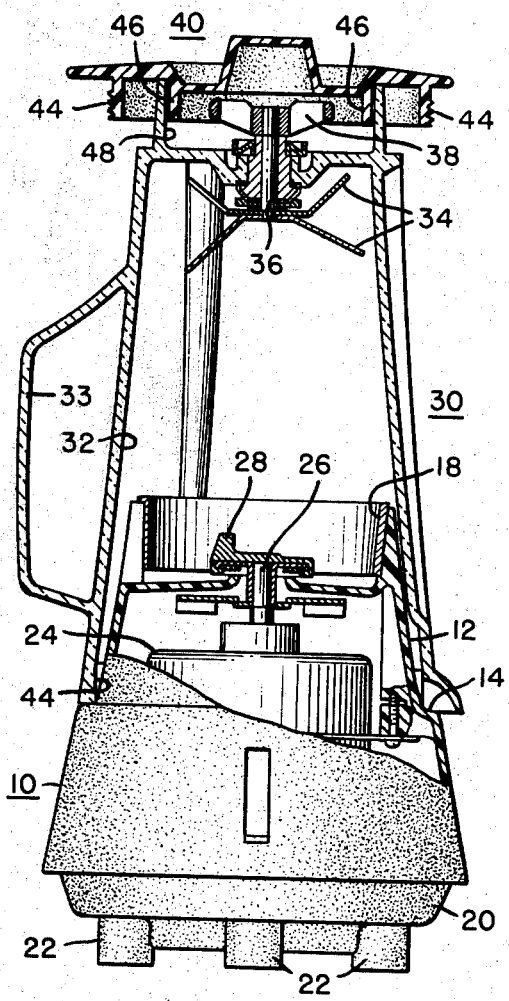
FIG. 3 is a view similar to FIG. 2 but illustrating the mixer in its upside-down position ready for packing.

Referring now to the drawings and in particular to FIGS. 1 through 3. there is illustrated a juice mixer constructed in accordance with the teachings of the invention. The arrangement illustrated comprises a main hollow body made of any suitable plastic into the form of a stepped frusto-cone. The main body generally designated by the reference numerals 10 has an outer peripheral surface 12 provided on the middle portion with a peripheral shoulder or seat 14 in the form of an annulus and includes a recess 18 on the top or smaller end face. The main body 10 has a larger end face or a bottom open and detachably closed by a cover plate 20 of steel having secured on the lower surface a plurality of rubber legs 22. In the embodiment illustrated three legs 22 are secured at substantially equal intervals on the lower or exposed surface of the cover plate 20.

Disposed within the main hollow body 10 is an electric motor 24 of vertical type having a rotary shaft 26 lying on the axis of the frusto-cone of the main body 10 and extending into the recess 18. A coupling element 28 is rigidly secured at the extremity of the projecting portion of the rotary shaft 26.

A cup member generally designated by the reference numeral 30 is made of any suitable transparent glass and normally disposed upon the main body 10 by having its closed end portion snugly fitted into the recess 18 on the top of the main body 10. The cup member 30 is open at the other end or the upper end as viewed in FIG. 1 larger in diameter than the closed end. In order to permit the opening of the cup member 30 to be fitted onto the main body 10 the cup member 30 has an inner peripheral surface 32 on the side of the opening complementary in shape to the upper half (as viewed in FIGS. 1 through 3) of the outer peripheral surface 12 of the main body 10. In other words, the inner peripheral surface 32 is in the form of a frusto-cone substantially identical to that for the outer peripheral surface 12 and particularly the upper half thereof. It has been found that the frusto-cone for the cup member 30 and therefore for the main body 10 has preferably a half an angle of cone equal to approximately 7 degrees.

For the purpose of permitting the cup member 30 to be easily handled, a grip 33 is attached to the outer peripheral surface thereof.

As shown, a cutter device including a plurality of blades 34 is rotatably disposed within the cup member 30 adjacent the bottom or lower end and rigidly mounted on a rotary shaft 36 at one end lying on the axis of the frusto-cone for the cup member 30. The rotary shaft 36 extends in liquid-tight relationship through the bottom of the cup member 30 into the recess 18 on the top of the main body 10. A coupling element 38 is rigidly secured to the other end of the rotary shaft 36 and adapted to engage the coupling element 26 on the motor shaft 26 when the cup member is in its normally used position as illustrated in FIG. 2.

A cover member of any suitable plastic generally designated by the reference numeral 40 normally covers the opening designated by the reference numeral 42 of the cup member 30. As best shown in FIGS. 2 and 3, the cover member 40 is provided on the inner side or that side facing the interior of the cup member 30 with a pair of concentric ridges 44 and 46. The outer annular ridge 44 is adapted to be fitted into the opening 42 of the cup member as in its normal used position where it is disposed upon the main body 10 with the opening 42 remote away from the latter for the purpose of closing the cup member. On the other hand, the inner annular ridge 46 is adapted to be fitted into a recess 48 formed on the outer surface of the bottom of the cup member 30 for the purpose of disposing the cover member 40 upon the bottom of the cup member 30 as in its upside-down position (see FIG. 3) ready for packing.

If it is desired to change the juice mixer from its normal used position as illustrated in FIGS. 1 and 2 to its position ready for packing as illustrated in FIG. 3 then the main body, cup member and cover member 10, 30, and 40 respectively can be first separated from one another. Then the cup member 30 is disposed upside-down upon the main body 10 to overlap it until the cup member 30 abuts against the annular shoulder 14 on the outer peripheral surface 12 of the main body 10 thereby to prevent the cutter device 34 from abutting against the upper end of the main body 10. Thereafter the cover member 40 is disposed upon the bottom of the cup member or that end thereof now directed upwardly by having the inner annular ridge 46 fitted into the recess 48 on the cup member 30 resulting in the readiness for packing.

Figure 6:
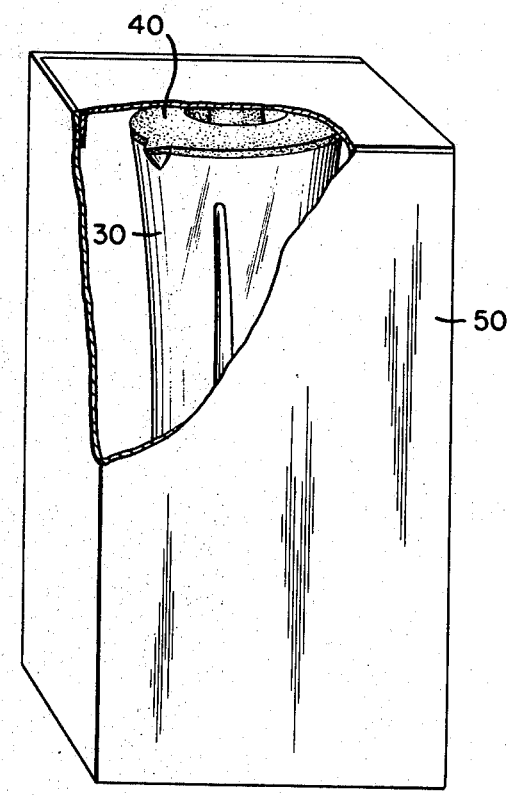
FIG. 6 is a view similar to FIG. 4 but illustrating a juice mixed of the conventional construction.
Figure 4:
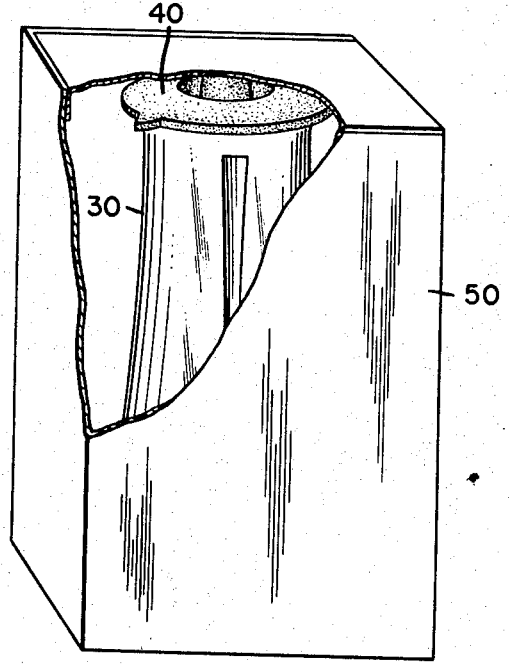
FIG. 4 is a perspective view of the mixer in its upside-down position disposed in a packing box with parts broken away.

The mixer thus assembled is now positioned in a packing box 50 as shown in FIG. 4. For control purpose, FIG. 6 shows a juice mixer of the conventional construction positioned in the corresponding packing box 50.

From the foregoing it will be appreciated that the overall height of the present juice mixer ready for packing and therefore a volume required for packing it decreases as compared with the conventional ones because the cup member overlaps the main body in its packed position.

Figure 5:
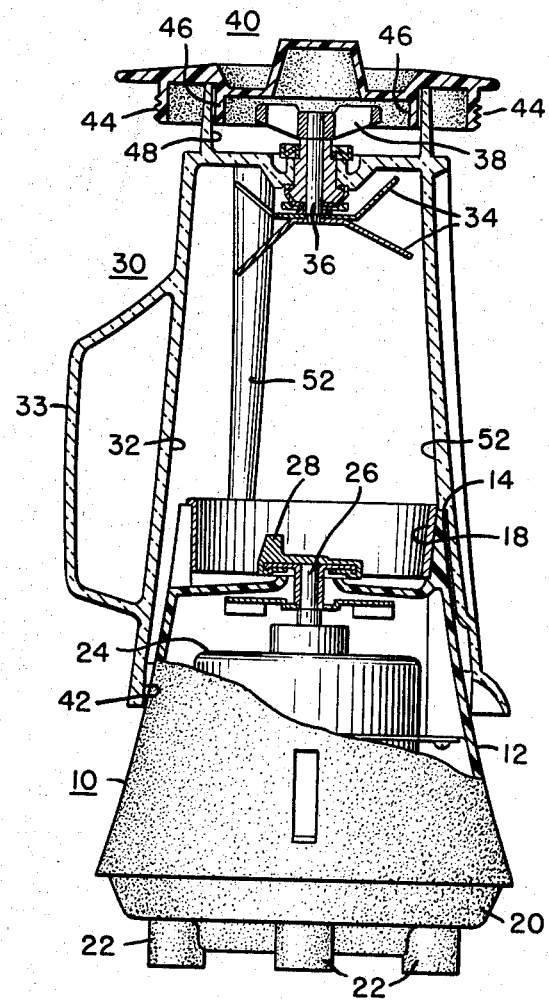
FIG. 5 is a view similar to FIG. 3 but illustrating a modification of the invention.

While the invention has been illustrated in terms of the peripheral shoulder 14 on the main body 10 serving as a seat for receiving the cup member or means for limiting the overlap of the cup member or the main body it is to be understood that such means may be in any suitable form. For example, a plurality, for example, three of longitudinal ridges 52 may be disposed at substantially equal angular intervals on the inner peripheral surface on the side of the opening of the associated cup member 30 as shown in FIG. 5. The ridges 52 should be of a length sufficient to prevent the associated cutter device from abutting against the top face of the main body when the cup member is disposed upside-down upon the main body. In other respects, the arrangement is identical to that shown in FIGS. 1 through 4.

Also it will be appreciated that a pair of annular ridges 44 and 46 on the cover member effectively prevent the cover member 40 from accidentally disengaging from the cup member 30 in its normal and upside-down positions.

What we claim is:

1. A juice mixer comprising a main hollow body having disposed therein an electric motor of vertical type including a rotary shaft, a cup member detachably secured upon the main body and having an opening at one end, a detachable cover member for closing said opening of said cup member, rotatable cutter means including a rotary shaft and disposed within said cup member at the other closed end to be driven by said electric motor, and a pair of coupling elements mounted on said rotary shafts of said electric motor and cutter means respectively and capable of engaging each other when the mixer is in its normal used position where said cup member is disposed upon said main body while said opening of said cup member is remote away from said main body, wherein said main body has that half portion nearer to the cup member in the form of a frusto-cone formed about the axis of the rotary motor shaft and having a smaller end at the free end of said half portion of said main body, and the inner peripheral surface on the side of the opening of said cup member is complementary in shape to said outer peripheral surface of said half portion of said main body so that the cup member disposed upside-down upon the main body overlap the main body.

2. A juice mixer as claimed in claim 1, comprising an annular shoulder disposed on said outer peripheral surface of said main body to receive the edge of the opening of said cup member in its upside-down position.

3. A juice mixer as claimed in claim 1, comprising a plurality of longitudinal ridges disposed at substantially equal angular intervals on the inner peripheral surface on the side of the opening of said cup member to limit the overlap of the upside-down cup member on the main body.

4. A juice mixer as claimed in claim 1, wherein said cup member has a peripheral edge disposed on the outer surface of the bottom, and said cover member is provided on that side facing the cup member with a pair of concentric annular ridges selectively engageable with said opening and said peripheral edge of said cup member to limit the overlap of the cup member on the main body.

References Cited
UNITED STATES PATENTS

| | | |
|---|---|---|
| 2,744,203 | 5/1956 | Collura. |
| 2,755,900 | 7/1956 | Seyfried. |
| 2,794,627 | 6/1957 | Rodwick. |
| 3,344,829 | 10/1967 | Ripple. |

ROBERT W. JENKINS, Primary Examiner